(No Model.)

H. F. PARSHALL.
COMMUTATOR AND BRUSH.

No. 446,536. Patented Feb. 17, 1891.

Witnesses.
J. K. E. Diffenderffer
E. E. Woolley

Inventor.
Horace F. Parshall
by
Price & Stuart
Attorneys.

UNITED STATES PATENT OFFICE.

HORACE F. PARSHALL, OF BALTIMORE, MARYLAND, ASSIGNOR TO THE WENSTROM CONSOLIDATED DYNAMO AND MOTOR COMPANY OF BALTIMORE CITY, OF SAME PLACE.

COMMUTATOR AND BRUSH.

SPECIFICATION forming part of Letters Patent No. 446,536, dated February 17, 1891.

Application filed July 30, 1890. Serial No. 360,420. (No model.)

*To all whom it may concern:*

Be it known that I, HORACE F. PARSHALL, of the city of Baltimore and State of Maryland, have invented certain new and useful improvements in commutators and brushes and their arrangement with each other, designed for use upon reversible dynamo-electric machines used either as generators or motors, of which the following is a specification.

It is well known that when a brush has its position so arranged upon the commutator of a dynamo or motor, the operation thereof is smooth so long as the commutator is running away from the angle of inclination of the brush, and that when running in the reverse direction there is what is known among electricians as a "chattering" of the brush and a continual sparking and heating of the commutator. To avoid this difficulty various devices have been used, among which the standing of the brush in a radial line with the commutator or at right angles to its axis has been used with fairly good effect.

My invention relates to the arrangement of brushes for overcoming these defects.

The accompanying drawings illustrate the invention, of which—

Figure 1:
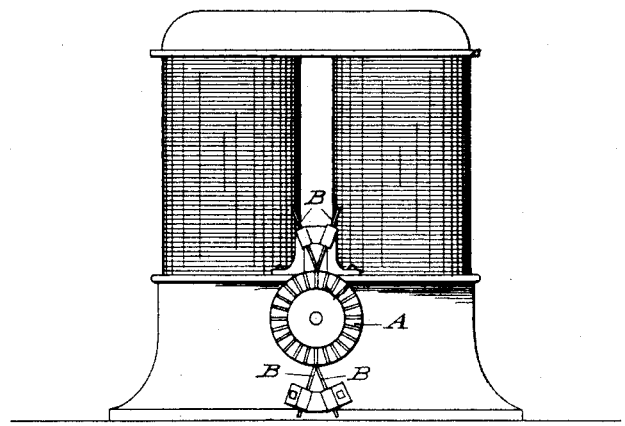
Figure 2:
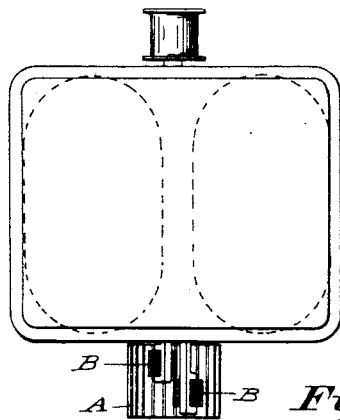
Figure 3:
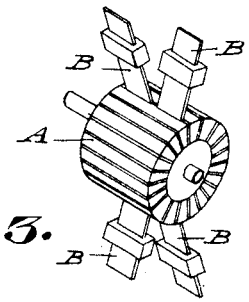
Figure 4:
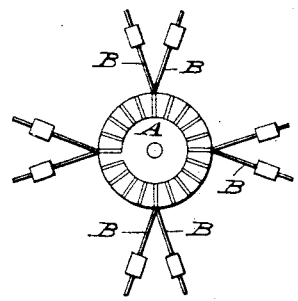

Figure 1 is a view of a machine, showing the end of the commutator with brushes properly arranged thereon according to my invention; Fig. 2, a top view of a machine with commutator and brushes; Fig. 3, a perspective view of a commutator, showing the brushes as arranged upon a two-pole machine. Fig. 4 illustrates a commutator with brushes arranged on a four-pole machine.

A is a commutator of a dynamo or motor, such as are known as "reversible," or those which are regulated to run in either direction.

B B are the brushes, resting upon the bars of the commutator or held thereon by means of a spring or other usual method of placing them. On the bipolar machine there are two brushes above and two below, which run at an angle to the commutator and at an angle to each other—that is to say, one of the brushes B above and below the commutator bears thereupon in such position that the commutator runs away from this angle of inclination while revolving in one direction and toward it while revolving in the other direction. Thus it will be seen that the revolution of the commutator is always in a direction away from the angle of one of the brushes above and below, so that should chattering occur upon the other brush there would be no bad effect caused therefrom, and no sparking or burning will occur, because the current would always be taken up and carried off by the brush having the proper angle of inclination. It is easy to see how this principle may be carried out in multipolar machines by placing the brushes thereon in the same way at proper distances, as shown in Fig. 4, which illustrates the arrangement on a four-pole machine.

What I claim, and desire to secure by Letters Patent, is—

In a reversible electric machine or motor, a commutator provided with bars or sections connected with the wires of the armature, in combination with a pair of brushes arranged thereon, with opposite inclinations, and making sliding contact with the same bar or section of the commutator.

HORACE F. PARSHALL.

Witnesses:
M. TURNER,
FELIX R. SULLIVAN.